United States Patent Office 3,005,575
Patented Oct. 24, 1961

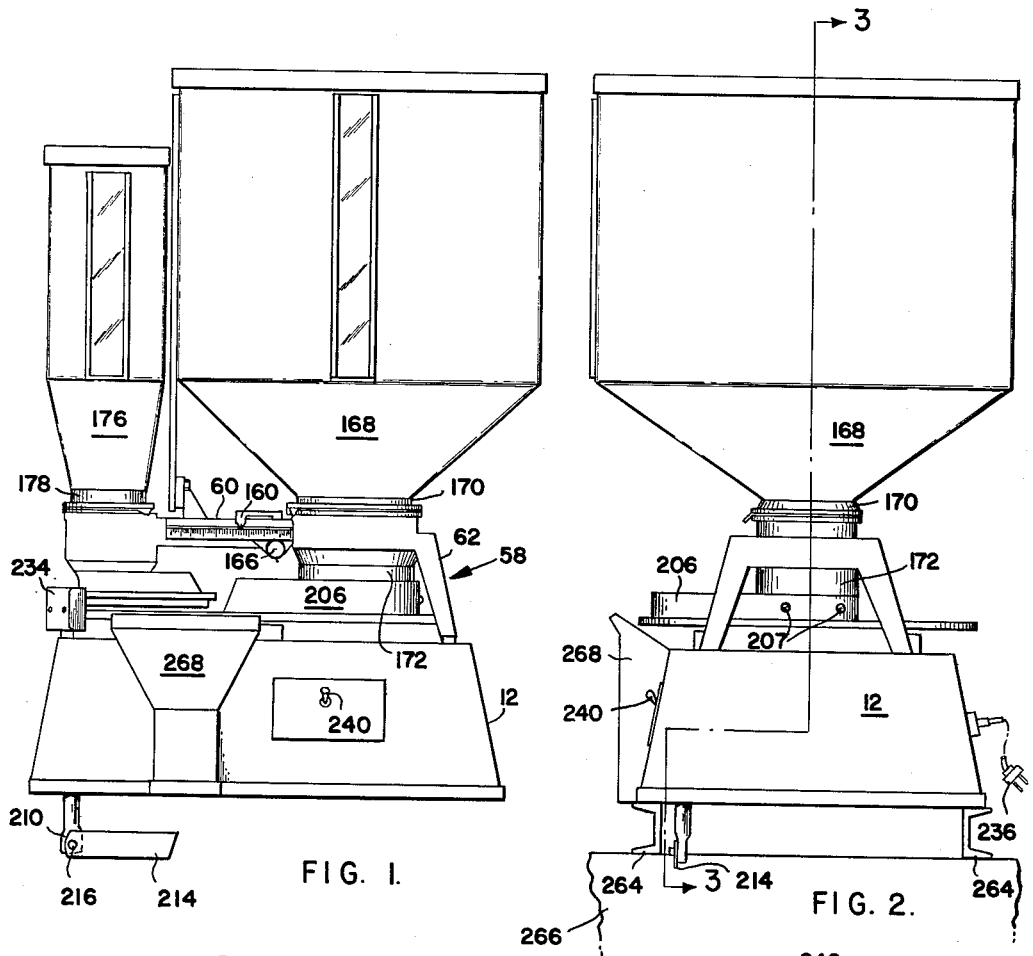
FIG. 1.
FIG. 2.
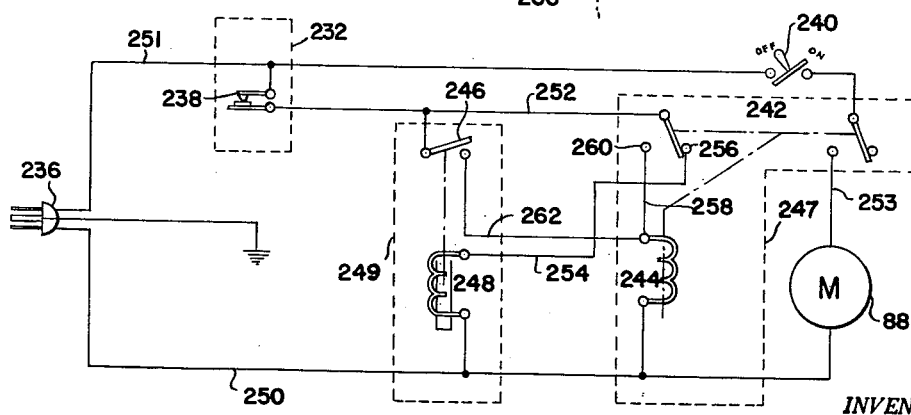
FIG. 5.
INVENTORS
NATHANIEL BREWER &
MELVILLE M. WILSON

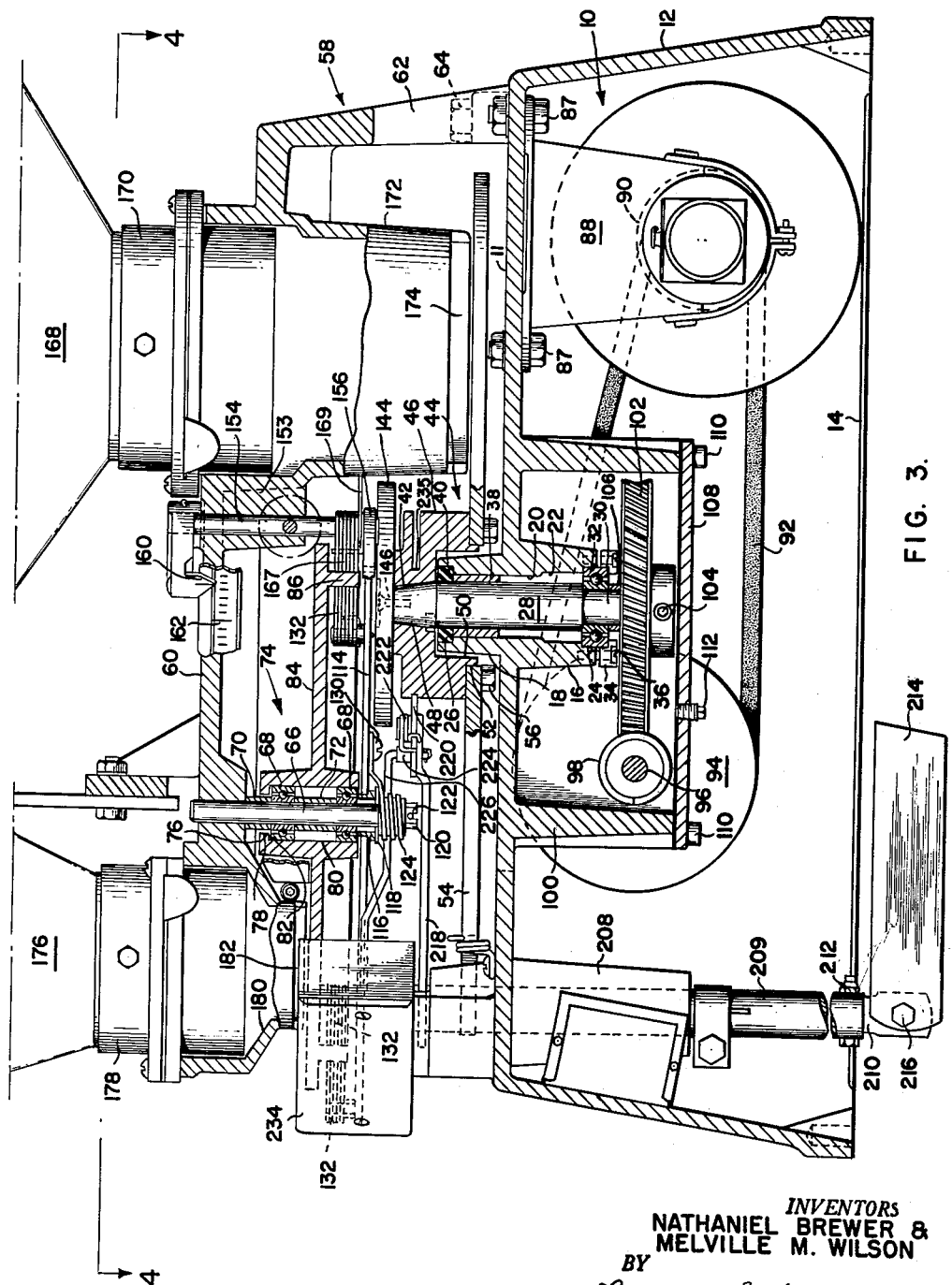

3,005,575
APPARATUS FOR BLENDING MATERIALS
Nathaniel Brewer, Newtown, Pa., and Melville M. Wilson, Princeton, N.J., assignors to Wilson Products, Inc., Neshanic, N.J., a corporation of New Jersey
Filed Sept. 18, 1959, Ser. No. 840,945
11 Claims. (Cl. 222—56)

This invention relates generally to apparatus for blending free flowing solid materials.

It is, for example, useful for proportioning solid color concentrates to uncolored resins being fed to the hoppers of extruders and for purposes of illustration its use in this connection will be described.

Heretofore, in blending color concentrates with uncolored compounds being fed to the hoppers of extruders, it has been the general practice to tumble the color concentrates into the uncolored compounds prior to feeding it to the extruder, the process being a batch process. This practice has not proved to be entirely satisfactory because tumbling equipment is expensive, requires considerable floor space and labor costs are high because the tumbled compound must be transported to the extruder. In addition, while transporting the drums into which the color concentrate has been tumbled, the color concentrate tends to separate from the compound, in consequence of which the color of the product is not uniform. Furthermore, since the compound and color concentrate are tumbled in batches, a batch is always at least a little in excess of what is required for a given run, and what is left over is wasted. Accordingly, an important object of the present invention is to provide apparatus which continuously blends the materials and feeds them in a steady stream to the extruder hopper progressively as needed without waste.

Another important object of the present invention is to provide such an apparatus which proportions the color concentrate to the compound accurately so that the product is uniform in color.

Still another object of the present invention is to provide such an apparatus which facilitates a change over from one color concentrate or compound to another.

A further object of the present invention is to provide such apparatus which is portable.

And still a further object of the present invention is to provide such apparatus which automatically shuts off when the level of the material in the extruder hopper rises to a predetermined height and which automatically restarts when the level of the material in the extruder hopper recedes from the height aforesaid.

Other objects and advantages of the present invention will appear more fully from the following description read in conjunction with the accompanying drawings, in which:

FIGURE 1 is a front elevation of the apparatus;

FIGURE 2 is a side elevation of the apparatus shown in FIGURE 1;

FIGURE 3 is an enlarged vertical section taken on line 3—3 of FIGURE 2;

FIGURE 5 is a wiring diagram.

Figure 4:
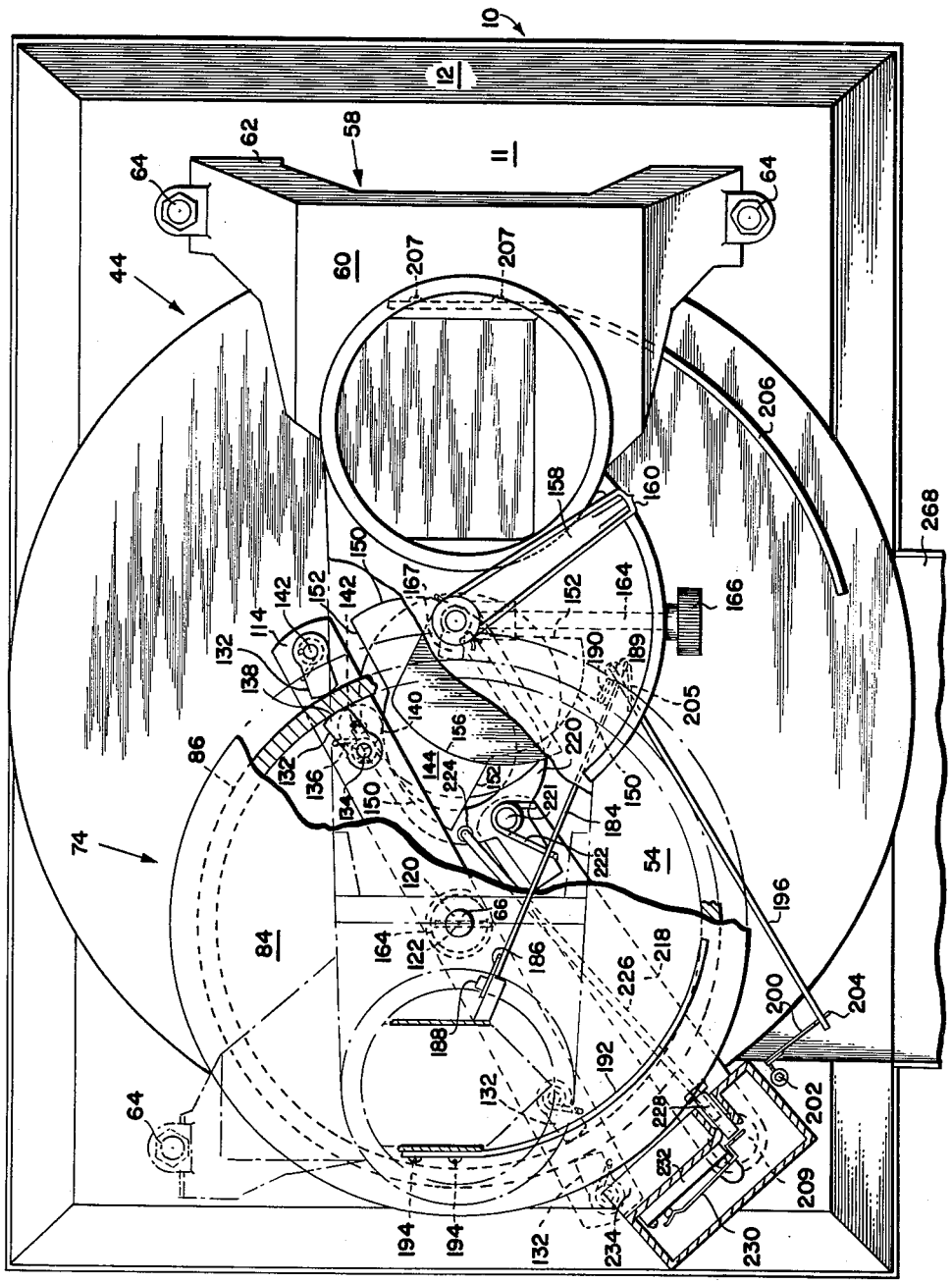
FIGURE 4 is a horizontal section taken on line 4—4 of FIGURE 3.

An exemplary apparatus constructed in accordance with the present invention comprises a base, generally designated 10, having a horizontally extending top wall 11 surmounting upright side walls 12, the bottom of the base being open, as at 14. Depending from a central area of the top wall 11 is a boss 16, and extending upwardly in longitudinal continuation of the latter is a boss 18. These bosses are provided with a central bore 20 having an enlarged diameter counterbore 22 and a further enlarged counterbore 24 formed in the boss 16, and an enlarged counterbore 26 formed in the boss 18. Extending freely through the bore 20 is a spindle 28 having a reduced diameter lower end portion 30 extending through a ball bearing unit 32 fitted into the counterbore 24 and secured in place by a retainer ring 34 fixed to the boss 16 by studs 36. The upper end of the spindle 28 extends through a sleeve bushing 38 fitted in the bore 20 and an annular seal 40 fitted in the counterbore 26. The upper terminal portion of the spindle 32 is tapered, as at 42. Fixed to the upper end of the spindle is a stock table, generally designated 44, including a hub 46. The hub is provided with a central tapered bore 48 which receives the tapered upper terminal of the spindle, and with a counterbore 50. Extending about the undersurface of the hub is a recess 52 which receives the inner peripherally extending marginal portion of an annular plate 54 secured to the hub 46 by studs 56.

Seated upon the base 10 is a hopper support 58 having a horizontally extending top wall 60 supported upon legs 62 secured to the top wall of the base by bolts 64. Depending from the top wall 60 is a pintle 66 carrying a pair of axially spaced ball bearings 68 and sleeve spacers 70 and 72. Mounted for rotation about the pintle 66 is a color table, generally designated 74, having a hub 76 which is centrally bored, as at 78, and counterbored, as at 80. The circumferentially extending shoulder 82, between the bore and counterbore, is seated upon the outer race of the upper ball bearing unit 68. Integrally formed with the hub 76 is an annular plate 84 from which there depends a ring 86 concentric with, but lesser in diameter than, the annular plate 84.

Secured to the top wall of the base, as by bolts 87, is an electric motor 88 which mounts a pulley 90 about which is trained a V-belt 92. The latter is also trained about a pulley 94 mounted upon a shaft 96 which carries a worm 98. The shaft 96 is suitably journaled in a wall 100 depending from the top wall of the base. The worm meshes with a worm wheel 102 fitted over the lower terminal portion of the spindle 28 and secured thereto by a setscrew 104. Intervening the worm wheel and the overlying inner race of the ball bearing 32 is a sleeve spacer 106. The wall 100 embraces the worm and worm wheel, and at the lower terminal end thereof is a closure plate 108 secured to the wall 100 by studs 110 and fitted with a plug 112.

Underlying the color table 74 is a flat bar arm 114, which arm is fitted over the lower end portion of the pintle 66 through the medium of a bushing 116. Underlying the bushing 116 is a flat washer 118, and underlying the latter is a nut 120 threaded on the lower terminal portion of the pintle 66. The nut is provided with a diametrically extending groove 122 which receives one end of a torsion spring 124, the other end of the torsion spring being secured to the arm 114 as by a stud 130. Each end of the arm 114 carries a pair of dogs 132 made of suitable friction inducing material, each of which is rockably mounted upon a pin 134 and biased by a torsion spring 136 in a direction for engagement of the rounded free end 138 thereof with the ring 86 depending from the plate 84. Depending from the arm 114 is a cam follower in the form of a roller 140 revolvable upon a pin 142, which roller is adapted for engagement with a color table advance cam 144 secured to the upper end of the spindle 28 as by a screw 146. This advance cam is provided with three identical cam sections each having a curvilinear cam surface 150 and a straight cam surface 152.

Formed integral with the top wall of the hopper support is a boss 153 through which there extends a shaft 154 mounting at the lower end thereof a stop cam 156 which is in the horizontal plane of arm 114 and is adapted to limit the travel of arm 114. Extending radially outwardly from the upper terminal portion of the shaft 154 is a lever 158 having at the outer end thereof an indicator 160 overlying a scale 162. The shaft 164 is axially fixed, but may be rocked about its longitudinally extending axis and fixed in a selected position by a pin 164, the end of which pin may be brought into frictional engagement with the shaft by manipulation of a knob 166. This shaft also mounts a dog 167 made of suitable friction inducing material and constantly urged against the ring 86, as by a torsion spring 169, for securing the color table against turning except under the influence of the dogs 132.

Mounted upon the hopper support is a stock hopper 168 having at the lower end thereof a cut-off slide gate unit 170 fitted into a downspout forming portion 172 of the hopper support. This downspout formation terminates just above the surface of the annular plate 54 except on the side thereof from which material is drawn from the hopper, on which side the spout terminates a substantial distance from the annular plate 54 to leave an opening 174 for passage of the material. Also mounted upon the hopper support is a color hopper 176 having at the lower end thereof a cut-off slide gate unit 178 fitted into a downspout forming portion 180 of the hopper support. This downspout formation terminates a short distance above the annular plate 84 except for the wall thereof on the side of the downspout from which material is to be drawn, on which side the downspout terminates a substantial distance above the annular plate 84 thereby to provide an opening 182 through which material may pass.

Extending across the plate 84 is a color scraper 184, one end portion of which is secured to the downspout formation 180 through the medium of a spring 186 and bolt 188, and the other end portion of which is secured to a rod 189 by spring 190, the rod 189 being fixed by its upper end to the top wall of the hopper support. Extending from the downspout formation 180 is an arcuate guard 192 secured in place by bolts 194. Extending across the annular plate 54 is a stock scraper 196 having one end thereof secured in place by a spring 200 anchored to the hopper support by a bolt 202 and extending through the end of the scraper, as at 204. The opposite end of the scraper is secured in place by a spring 205 carried by the rod 189. Extending from the downspout formation 172 is an arcuate guard 206 secured in position by bolts 207.

Extending downwardly through a boss 208, depending from the top wall of the base, is a tube 209, the lower end of which receives a rod 210 which may be axially fixed in position through the medium of a bolt 212. The lower extremity of the rod 210 mounts a paddle 214 secured in position as by a bolt 216. The upper end of the tube 209 has fixed thereto a radially extending arm 218 which carries a bifurcated extension 220 pivoted on the arm 218 as at 221. Associated with the arm 218 and its bifurcated extension 220 is a torsion spring 222 which acts to keep the arm and its extension longitudinally aligned. Pivotally connected to one of the furcations, as at 224, is one end of a rod 226. The other end of the rod 226 is slidably received in a sleeve 228 through which it may be shifted for operating the spring arm 230 of a switch 232 housed in a switch box 234. The bifurcated extension 220 of the arm 218 slidably engages with an eccentric formation 235 formed on the hub 46.

The electrical system for operating the apparatus includes a plug 236 for connection to a suitable source of power, contacts 238 of switch 232, on-off switch 240, a double-pole double-throw switch 242 controlled by a solenoid 244, a single-pole single-throw switch 246 controlled by a solenoid 248 and the motor 88. The switch 242 and solenoid 244 are included in a motor control relay 247, and the switch 246 and the solenoid 248 are included in a time delay relay 249. A pair of leads 250 and 251 extend from the plug 236 respectively to the motor 88 and the switch 240. A lead 253 extends between the latter and the motor 88 and has connected therein one section of the switch 242. A lead 252 from the lead 251 has connected therein contacts 238 of the switch 232. A lead 254 from one contact 256 of the switch 242 to the lead 250 has connected therein the coil of the solenoid 248. Another lead 258 from another contact 260 of the switch 242 to the lead 250 has connected therein the coil of the solenoid 244, and a lead 262 from the lead 252 to solenoid 244 has connected therein the switch 246.

The apparatus is designed to rest upon the hopper of an extruder, or the hopper feeding a preplasticizer for an injection molding machine, being carried by a pair of channels 264 bolted to the hopper 266. The stock hopper 168 is filled with, for example, uncolored, free flowing resin particles, and the color hopper 176 is filled with solid particles of a free flowing color concentrate, and the materials discharged from the hoppers are received respectively by the stock table 44 and color table 74, which latter table discharges onto the stock table 44 which in turn discharges into a chute 268 from whence the materials drop into the extruder hopper 266.

To start the apparatus, the plug 236 is connected into a suitable source of electric power, whereupon electric current is supplied through leads 251 and 252 and normally closed contacts 238, the left-hand section of switch 242 and contact 256 and lead 254 to the coil of the solenoid 248, which, after a time delay, acts to close the normally open switch 246. When the latter closes, current is supplied through the lead 262 to the coil of the solenoid 244, which acts to operate the switch 242. The left-hand side of the switch breaks contact at 256, whereupon the coil of the solenoid 248 is deenergized and the switch 246 opened. Immediately thereafter contact is established at 260, whereupon current is supplied to the coil of the solenoid 244 through the lead 258. Thus switch 242 is held in operated position. Simultaneously with the making of contact at 260, the right-hand section of the switch 242 closes, but no current is supplied to the motor 88 because the switch 240 is open. Upon closing the switch 240, current is supplied through the switch 240 and lead 253 to the motor 88.

The drive for the stock table 44 is via the motor pulley 90, belt 92, pulley 94, shaft 96, worm 98, worm wheel 102 and spindle 28. The drive for the color table is via the advance cam 144, roller 140, arm 114, dogs 136 and ring 86. The torsion spring 124 urges the arm 114 in a direction for engagement of the roller 140 with the curvilinear surfaces 150 of the advance cam 144. As the cam turns, the arm 114 is turned against the influence of the spring 124 and simultaneously the dogs 136 engage the ring 86 and turn the color table with the arm 114. When the advance cam has turned sufficiently so that the roller 140 leaves the curvilinear surface 150 and starts down the surface 152, the arm 114 is returned under the influence of spring 124, the dogs 136 passing freely along the ring 86 without moving the color table 74, thus the color table 74 is advanced intermittently, counterclockwise as viewed in FIGURE 4, through the action of the advance cam, there being three advances for each revolution of the spindle.

The extent of each advance may be controlled by positionally adjusting the stop cam 156. This may be accomplished by turning the knob 166 so as to free the shaft 154, turning the lever 158 to the desired position, thereby turning the shaft 154 and the stop cam 156, and then turning the knob 166 in the opposite direction to lock the shaft 154 in position again. When the cam surface of the stop 156 does not engage the arm 114, each advance of the color table, and consequently the rate of flow of color material, is a maximum. To reduce the advance, and consequently the rate of flow of color material, the cam surface of the stop 156 is brought into engagement with the opposed narrow edge of the arm 114 to effect some lost motion between the advance cam 148 and the roller 140.

As the spindle 28 rotates, the eccentric 235 causes oscillation of the assembly including the arm 218, its extension 220, rod 226, tube 209, rod 210 and paddle 214.

The uncolored, free flowing, resin compound stock is discharged from the hopper 168 through the valve 170 and downspout 172 onto the stock table 44. As the table rotates, clockwise as viewed in FIGURE 4, it draws the material out from under the hopper through the opening 174. The stock material moves on the stock table in a steady stream between the guard 206 and the scraper 196. Simultaneously, the free flowing color concentrate is discharged from the hopper 176 through the valve 178 and the downspout 180 onto the color table 74. The intermittently advanced color table draws the material from under the hopper 176 through the opening 182 and moves it along between the guard 192 and the scraper 184. Eventually, the material drops over the edge of the color table onto the stock table where it joins the steady stream of stock material and is discharged therewith over the edge of the stock table into the chute 268 from whence it drops into the underlying extruder hopper 266.

The paddle 214 is disposed in the extruder hopper 266, and when the material piles up in this hopper sufficiently to interfere with oscillation of the paddle, the assembly comprising the paddle 214, the rod 210, tube 209 and arm 218 are held fast. However, the bifurcated extension 220 turns about its pivot 221 against the influence of the torsion spring 222 thereby to shift the rod 226 axially a distance sufficient for actuating the spring arm 230 of the switch 232, causing the contacts 238 of the switch to open. As a consequence, the coil of the solenoid 244 is deenergized and the switch 242 operates to cut off the power supply to the motor and to terminate operation of the apparatus. When the level of the material in the extruder hopper falls sufficiently to free the paddle 214, the torsion spring 222 returns the bifurcated extension 220 and the rod 226 to their initial positions, whereupon the spring arm 230 is released and acts to again close the contacts 238 of the switch 232. When the contacts 238 reclose, the coil of the solenoid 248 is energized through lead 252, the left-hand section of the switch 242 and the contact 256, and the lead 254, and after a time delay of about ninety seconds the switch 246 of the time delay unit 249 closes, whereupon the coil of the solenoid 244 is energized and the switch 242 operates to deenergize the coil of the solenoid 248, reopen the switch 246 and supply power once again to the motor 88. The rate of feed initially is set to exceed the demand of the extruder. The time delay is provided to give the level of the material in the extruder hopper time to drop before feeding begins again. Thus unnecessary starting and stopping is eliminated.

It will be understood, of course, that the present invention, as hereinbefore described and shown in the accompanying drawings, is susceptible of various changes and modifications which may be made from time to time without departing from the general principles or real spirit of this invention. Accordingly, the invention is not to be regarded as restricted except as required by the appended claims.

What is claimed is:

1. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table in a direction opposite to the direction in which said first table is revolved thereby to draw material from said second container at a predetermined volumetric rate, and a second barrier for discharging material from said second table for introduction into said steady stream of material thereby to establish a steady stream in which said materials are present in predetermined quantities, said means for revolving said second table including pawl means, a cam follower, spring biased means mounting said pawl means and cam follower for movement back and forth as a unit along an arcuate path concentric with said second table, a member fixedly secured to said second table for contact by said pawl means during said back and forth movement thereof, said pawl means being adapted to unidirectionally grip said member during said back and forth movement for intermittently advancing said second table, and means for urging said follower in one direction along said arcuate path for intermittently advancing said second table in response to rotation of said first table including a cam fixed relative to said first table and revolvable therewith for actuating said mounting means against said spring bias.

2. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table in a direction opposite to the direction in which said first table is revolved thereby to draw material from said second container at a predetermined volumetric rate including pawl means mounted for movement back and forth along an arcuate path concentric with said second table, a member fixedly secured to said second table for contact by said pawl means during said back and forth movement thereof, said pawl means being adapted to unidirectionally grip said member during said back and forth movement for intermittently advancing said second table, and means for urging said pawl means back and forth along said arcuate path for intermittently advancing said second table in response to rotation of said first table, means for selectively varying the traverse of said pawl means along said arcuate path, and a second barrier for discharging material from said second table for introduction into said steady stream of materials thereby to establish a steady stream in which said materials are present in predetermined quantities.

3. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table in a direction opposite to the direction in which said first table is revolved thereby to draw material from said second container at a predetermined volumetric rate including pawl means mounted for movement back and forth along an arcuate path concentric with said second table, a member fixedly secured to said second table for contact by said pawl means during said back and forth movement thereof, said pawl means being adapted to unidirectionally grip said member during said back and forth movement for intermittently advancing said second table, and means for urging said pawl means back and forth along said arcuate path for intermittently advancing said second table in response to rotation of said first table, stop means in the form of a cam positionally adjustable for limiting the travel of said pawl means along said arcuate path, and a second barrier for discharging material from said second table for introduction into said steady stream of material thereby to establish a steady stream in which said materials are present in predetermined quantities.

4. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table thereby to draw material from said second container at a predetermined volumetric rate, a second barrier for discharging material from said second table for introduction into said steady stream of material thereby to establish a steady stream in which said materials are present in predetermined quantities, an electric switch adapted for being operated to cut off the power supply for said apparatus, and switch actuating means including an element eccentric relative to the axis of, and revolvable with, said first table, an articulated arm having a bifurcated end portion embracing said eccentric, means at the opposite end of said arm mounting the same for oscillatory movements, and a rod pivotally connected to the bifurcated end of said arm and shiftably pivotally connected to the opposite end of said arm, said rod being adapted under predetermined conditions when said arm is bent for being axially shifted for engaging said switch thereby to operate the same and terminate operation of the apparatus.

5. In combination a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table thereby to draw material from said second container at a predetermined volumetric rate, a second barrier for discharging material from said second table for introduction into said steady stream of material thereby to establish a steady stream in which said materials are present in predetermined quantities, an electric switch adapted for being operated to cut off the power supply for said apparatus, and switch actuating means including an element eccentric relative to the axis of, and revolvable with, said first table, an articulated arm spring biased into extended, unbent condition and having a bifurcated end portion embracing said eccentric, means at the opposite end of said arm mounting the same for oscillatory movements, and a rod pivotally connected to the bifurcated end of said arm and shiftably pivotally connected to the opposite end of said arm, said rod being adapted under predetermined conditions when said arm is secured against oscillatory movements and bent against said spring bias for being axially shifted for engaging said switch thereby to operate the same and terminate operation of the apparatus.

6. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, means for receiving said stream of material gravity discharged from said table, a second container for dry free flowing material, a second revolvable table for receiving material gravity discharged from said second container, means for revolving said second table thereby to draw material from said second container at a predetermined volumetric rate, a second barrier for discharging material from said second table for introduction into said steady stream of material thereby to establish a steady stream in which said materials are present in predetermined quantities, means connected in electric circuit for supplying power to said apparatus, and means for controlling said electric circuit including means responsive to a predetermined high level of material in said receiving means for automatically terminating operation of the apparatus, and responsive to a predetermined lower level of material in said receiving means for automatically restoring operation of said apparatus after a predetermined time delay.

7. In apparatus for blending dry free flowing materials, the combination comprising a pair of laterally spaced containers having discharge openings in the bottoms thereof, a pair of tables associated respectively with said containers, each of said tables being disposed with its central axis to one side of the discharge opening of the associated container, and being revolvable for passing successive areas thereof under the associated container for receiving gravity discharged dry free flowing material therefrom, means for revolving said tables thereby to draw material from under each container at a predetermined volumetric rate, means for removing from one table the material carried thereby and discharging it onto the other table thereby to establish a steady stream in which said materials are present in predetermined quantities, and means for discharging from the last-mentioned table the steady stream of material aforesaid, means for receiving said steady stream of material discharged from said last-mentioned table, electric circuit means for supplying operating power to said apparatus, and means for controlling said circuit means including means responsive to a predetermined high level of material in said receiving means for automatically terminating operation of the apparatus, and responsive to a predetermined lower level of material in said receiving means for automatically restoring operation of said apparatus after a predetermined delay.

8. In apparatus for blending dry free flowing materials, the combination comprising a pair of laterally spaced containers having discharge openings in the bottoms thereof, a pair of tables having mutually overlying areas and associated respectively with said containers, each of said tables being disposed with its central axis to one side of the discharge opening of the associated container, and being revolvable for passing successive areas thereof under the associated container for receiving gravity discharged dry free flowing material therefrom, means for revolving said tables in opposite directions thereby to draw material from under each container at a predetermined volumetric rate including means for varying the rate of advancement of one of said tables relative to the other table, means for removing from the higher one of said tables the material carried thereby and discharging it onto the lower one of said tables thereby to establish a steady stream in which said materials are present in predetermined quantities, and means for discharging from the last-mentioned table the steady stream of material aforesaid.

9. In apparatus for blending dry free flowing materials, the combination comprising a pair of laterally spaced containers having discharge openings in the bottoms thereof, a pair of tables associated respectively with said containers, each of said tables being disposed with its central axis to one side of the discharge opening of the associated container, and being revolvable for passing successive areas thereof under the associated container for receiving gravity discharged dry free flowing material therefrom, means for revolving said tables thereby to draw material from under each container at a predetermined volumetric rate including means for intermittently advancing one of said tables in response to continuous rotation of the other, means for removing from one table the material carried thereby and discharging it onto the other table thereby to establish a steady stream in which said materials are present in predetermined quantities, and means for discharging from the last-mentioned table for the steady stream of material aforesaid.

10. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table thereby to draw material from said second container at a predetermined volumetric rate, a second barrier for discharging material from said second table for introduction into said steady stream of material thereby to establish a steady stream in which said materials are present in predetermined quantities, an electric switch adapted for being operated to cut off the power supply for said apparatus, and switch actuating means including an arm member, means mounting said arm for oscillatory movements about one end thereof, an eccentric element engaged with the opposite end of said arm and operable for oscillating said arm, means operatively interposed betwen said switch and arm and operable by the latter under predetermined conditions for engaging said switch thereby to operate the same and terminate operation of the apparatus.

11. In combination, a container for dry free flowing material, a revolvable table for receiving material gravity discharged from said container, means for revolving said table thereby to draw material from said container in a stream having a substantially constant volumetric rate of flow, a barrier for discharging said stream of material from said table, a second container for dry free flowing material, a second revolvable table for receiving material gravity discharged from said second container, means for revolving said second table thereby to draw material from said second container at a predetermined volumetric rate, a second barrier for discharging material from said second table for introduction into said steady stream of material thereby to establish a steady stream in which said materials are present in predetermined quantities, an electric switch adapted for being operated to cut off the power supply to said apparatus, and switch actuating means including an articulated arm having a pair of sections yieldably fixed relative to one another, means mounting said arm for oscillatory movements about one end thereof, an eccentric element engaged with the opposite end of said arm and operable for oscillating said arm, means operatively interposed betwen said switch and arm and operable by said arm, when said pair of arm sections shift angularly relative to one another, for engaging said switch thereby to operate the same and terminate operation of the apparatus.

References Cited in the file of this patent

UNITED STATES PATENTS

| | | |
|---|---|---|
| 830,543 | Trump et al. | Sept. 11, 1906 |
| 1,390,271 | Booth | Sept. 13, 1921 |
| 1,725,226 | Taylor | Aug. 30, 1929 |
| 2,117,805 | Hoefling | May 17, 1938 |
| 2,408,221 | Michel | Sept. 24, 1946 |
| 2,680,298 | Obenshain | June 8, 1954 |